United States Patent [19]

Merzweiler

[11] 3,986,299
[45] Oct. 19, 1976

[54] PLANTER

[75] Inventor: Leo A. Merzweiler, Bath, Ohio

[73] Assignee: Summit Plastic Corporation, Tallmadge, Ohio

[22] Filed: Feb. 10, 1975

[21] Appl. No.: 548,334

[52] U.S. Cl. .................................. 47/37; 47/34.13; 47/34.11; 229/2.5 EC; 220/23.8; 206/423; 229/28 R
[51] Int. Cl.² .................... A01G 23/00; A01G 9/10
[58] Field of Search .......... 47/34.13, 38.1, 38.13 X, 47/38, 37, 34, 34.11; 220/23.4, 23.8; 206/423; 229/2.5, 28 R

[56] References Cited
UNITED STATES PATENTS

| 548,763 | 10/1895 | Simpson | 47/37 |
|---|---|---|---|
| 2,814,911 | 12/1957 | Shep | 47/38.1 |
| 2,865,137 | 12/1958 | Longacre | 47/38.1 |
| 3,146,929 | 9/1964 | Keim | 229/2.5 |
| 3,164,478 | 1/1965 | Bostrom | 229/2.5 X |
| 3,342,397 | 9/1967 | Duttsman | 229/2.5 |
| 3,400,873 | 9/1968 | Bessett | 229/2.5 |
| 3,447,261 | 6/1969 | Hundt | 47/34.13 |
| 3,513,594 | 5/1970 | Hasselbach | 47/34.13 X |
| 3,557,489 | 1/1971 | Ferrand | 47/34.13 X |
| 3,647,105 | 3/1972 | Keeslar | 220/23.4 |
| 3,783,555 | 1/1974 | Peters | 47/38 |
| 3,788,002 | 1/1974 | Suchka | 47/34.13 |
| 3,868,054 | 2/1975 | Congleton | 229/2.5 |

Primary Examiner—Edgar S. Burr
Assistant Examiner—James R. Feyrer
Attorney, Agent, or Firm—Frederick K. Lacher

[57] ABSTRACT

A multicavity planter having separable opposing sides and a base with abutting partitions extending from the sides and base at spaced apart intervals to divide the enclosed space into separate cavities. The abutting partitions have flanged edges on one partition in overlapping relation with the sides of another partition to limit root growth between cavities. Releasable pin and socket connections hold the partitions together and the walls of the cavities are sloped to retain the plants in the cavities until they are ready for transplanting. Depressions in the base are provided through which holes may be punched to irrigate plants in the cavities.

2 Claims, 6 Drawing Figures

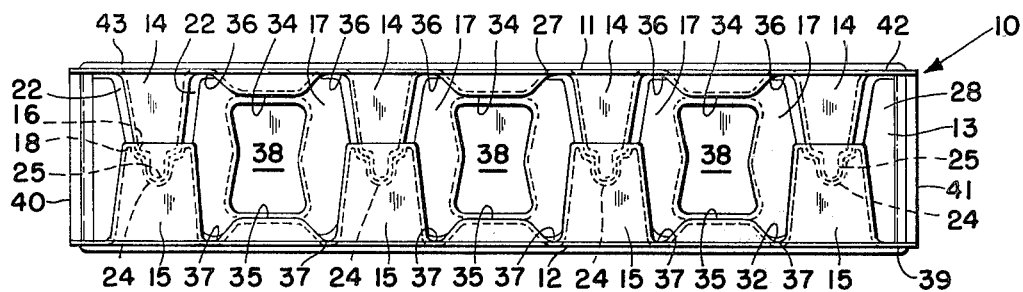
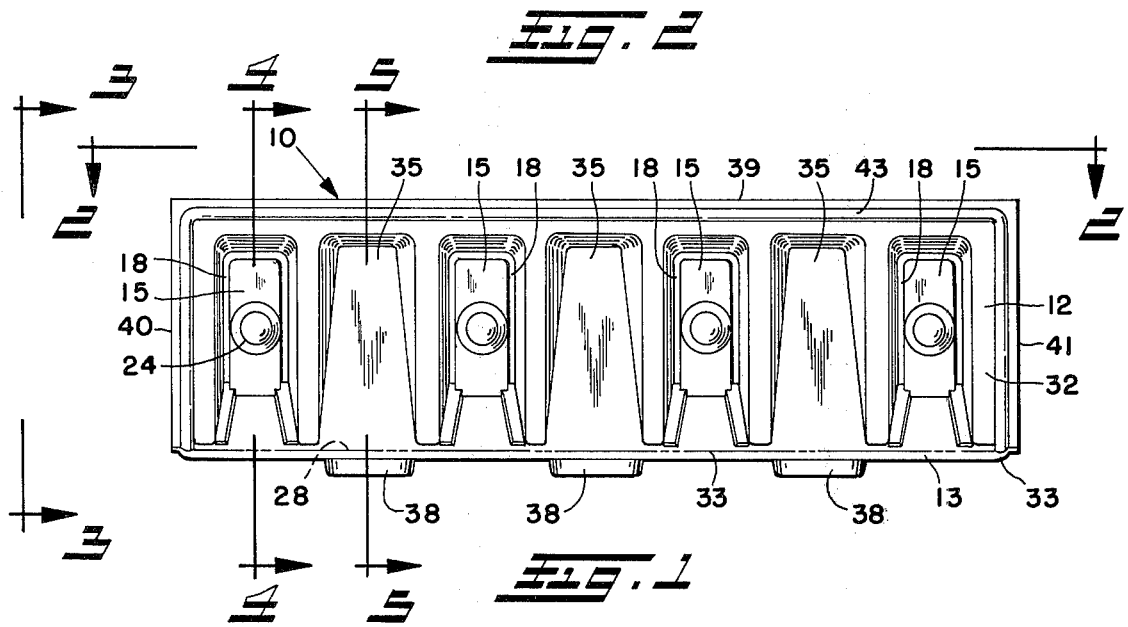
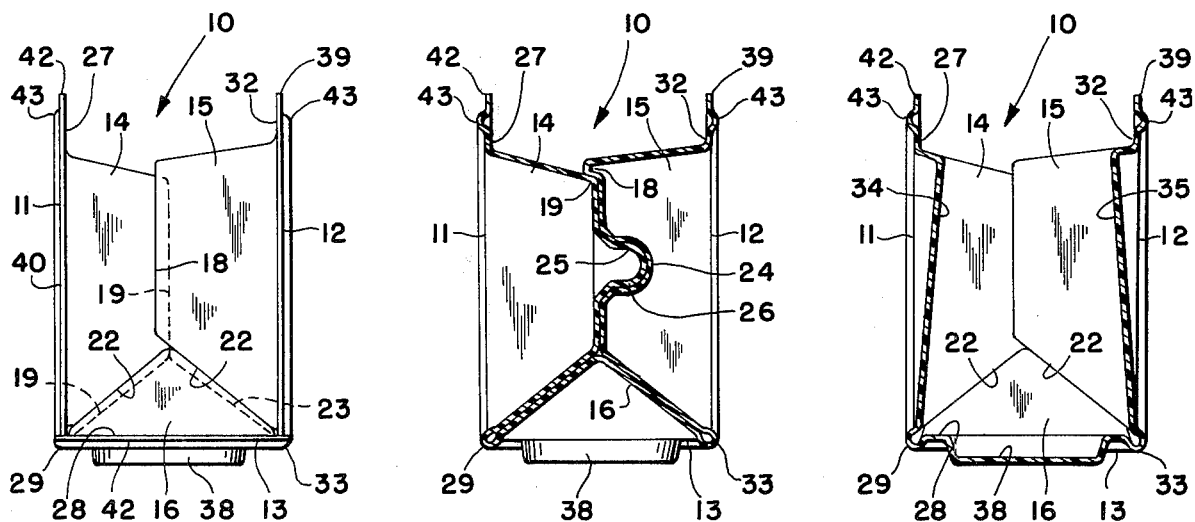

PLANTER

BACKGROUND OF THE INVENTION

This invention relates to multicavity containers and especially to seedling planters which can be disassembled to remove the seedlings when they are ready for transplanting. Heretofore containers of this type have had partitions with abutting edges which left cracks through which the roots would grow from one cavity to the next. As a result when the containers were disassembled the roots of the seedlings would be intermeshed and the plants were subject to damage while being pulled apart.

The containers used heretofore also were held in the assembled condition by adhesives between the parts or they were used as an insert in another container which would hold the parts together. The adhesive was not desirable because the force necessary to break loose the assembly could also damage the seedlings or the adhesive could give way too soon with damage to the seedlings. Using another container to hold the parts together was also undesirable because of the cost of the second container.

The planters containing seedlings are moved from place to place and often shipped by truck, rail or plane. It has been found that during this shipment the planters may be turned over and tilted. With the planters used heretofore some of the plants have fallen out of the cavities and were damaged or destroyed. There has also been a problem providing the necessary watering of the plants through the base.

SUMMARY OF THE INVENTION

In accordance with the present invention, a multicavity container is provided in which the joints in the partitions between cavities substantially eliminate root growth between cavities. The partitions are held together by releasable connectors for disassembly without damaging the plants. Also the cavity configuration provides for retaining the plants while the container is being moved from place to place and also for watering the plants through the base.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 1 is a front elevational view of a container embodying the invention.

FIG. 2 is a plan view of the container shown in FIG. 1 taken along the plane of line 2—2 of FIG. 1.

FIG. 3 is an end view taken along the plane of line 3—3 of FIG. 1.

FIG. 4 is a sectional view taken along the plane of line 4—4 of FIG. 1.

FIG. 5 is a sectional view taken along the plane of line 5—5 of FIG. 1.

DETAILED DESCRIPTION

Figure 6:
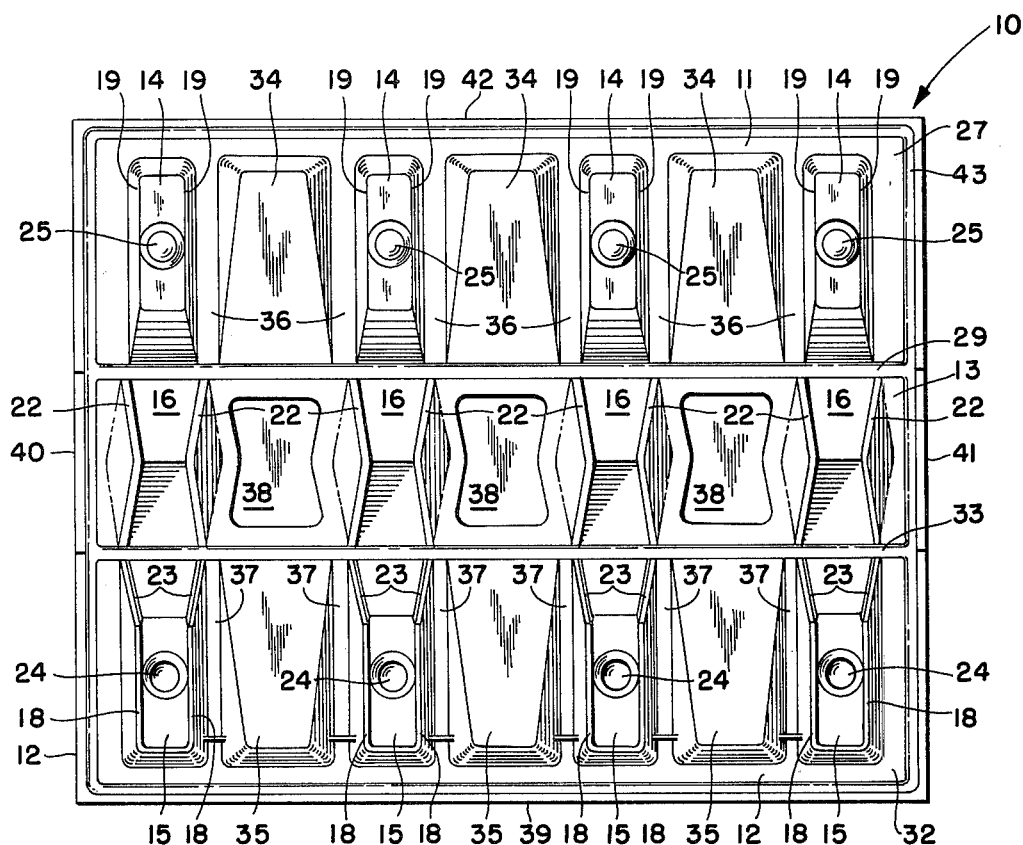
FIG. 6 is a plan view of the container base and sides shown in the open unfolded condition.

Referring to FIGS. 1, 2 and 3, a multicavity planter 10 is shown having opposing sides 11 and 12 and a base 13. The side 11 has partitions 14 extending towards the side 12 and abutting partitions 15 on side 12 which extend towards the side 11. In addition, the base 13 has generally peaked partitions 16 extending upwardly into abutting engagement with partitions 14 and 15 of the sides 11 and 12.

The abutting partitions 14, 15 and 16 are located at spaced-apart positions along the length of the planter 10 providing cavities 17 therebetween for containing the soil in which seedlings are planted.

As shown more clearly in FIGS. 2 and 4, the partitions 15 have flanged edges 18 overlapping edges 19 at the sides of the partitions 14. In addition, the partitions 16 of the base 13 have flanged edges 22 overlapping edges 19 at the bottom of partitions 14 and edges 23 at the bottom of partitions 15, shown in dotted lines in FIG. 3. These flanged edges 15 and 22 overlapping the edges 14 and 15 provide a close fit between the partitions 14 and 15 of the sides 11 and 12 and the partitions 16 of base 13 to prevent growth of roots from a plant in one of the cavities 17 through the joints between the partitions into another of the cavities.

Sockets 24 are provided in the faces of partitions 15 abutting the faces of partitions 14 for receiving pins 25 projecting from the abutting faces of the partitions 14 to releasably hold the partitions together and permit separation of the sides 11 and 12 for removal of the seedlings from the cavities 17. The pins 25 may have enlarged ends 26 and the sockets 24 may be necked to provide a snap fit, as shown in FIG. 4, whereby the partitions 14 and 15 are releasably connected.

Side 11 has a wall 27 which is connected to a wall 28 of the base 13 so as to permit separation of the side 11 from the base and in this embodiment the walls 27 and 28 are formed of the same plastic sheet material providing a hinge portion 29 between the side 11 and base 13. The side 12 also has a wall 32 formed of the same plastic sheet material as the base 13 and connected thereto by a hinge portion 33.

Panels 34 and 35 are located in the walls 27 and 32, respectively, between adjacent partitions 14, 15 and 16. As shown in FIG. 5, the walls 27 and 32 are parallel, each of these panels 34 and 35 is sloped inwardly towards the top of the planter so that the cavities 17 have a lesser width at the top than at the bottom to retain the soil in the cavities in the event the planter is tilted or inverted. The panels 34 and 35 terminate at spaced-apart distances from the partitions 14, 15 and 16 providing grooves 36 and 37 at the sides 11 and 12, respectively, of the cavities 17.

In the base 13, the wall 28 has recesses 38 extending below the wall and these may be punctured or otherwise perforated so that the planter 10 can be supported on the recesses in a position to receive water from suitable sources and thereby irrigate the seedlings in the cavities 17.

Outer edges 39, 40, 41 and 42 of the planter 10 may be reinforced with a rib 43 extending around the edges and being interrupted only at the hinge portions 29 and 33.

In the embodiment shown, the planter 10 has three cavities 17; however, it is understood that this planter may be made longer with more partitions 14, 15 and 16 to provide planters with 10, 20 or more cavities.

In operation, the planter 10 is used in the condition shown in FIGS. 1 through 5 for growing seedlings and transporting them to locations where they may be transplanted. The seedlings are then removed by separating the sides 11 and 12 which can be accomplished by pulling apart the partitions 14 and 15 causing the pins 25 to be released from the sockets 24. The sides 11 and 12 may then be spread open to a position shown in FIG. 6. After these seedlings and soil have been removed from the cavities 17, the sides 11 and 12 can again be hinged toward each other with the pins 25 inserted into the sockets 24 and the planters may be used again.

The planter 10 may be made by vacuum or pressure forming a sheet of plastic into the shape shown in FIG. 6 with those parts other than the walls 27, 28 and 32 being formed by heating the sheet and shaping it in a suitable mold causing hollow indentations of the shape of those configurations described hereinabove to be formed. The sides 11 and 12 need then only to be folded around the hinge portions 29 and 33 and brought together with the pins 25 engaged in the sockets 24 to provide the planter 10.

While certain representative embodiments and details have been shown for the purpose of illustrating the invention, it will be apparent to those skilled in the art that various changes and modifications may be made therein without departing from the spirit or scope of this invention.

I therefore, particularly point out and distinctly claim as my invention:

1. A multicavity planter comprising a base member and two opposing side members, abutting partitions on said side members disposed at spaced-apart positions along said side members providing cavities therebetween, said abutting partitions having base ends and abutting faces at joints between said partitions, at least one of said abutting faces at each of said joints having flanged edges extending throughout the length of said partitions in another plane from said one of said abutting faces, at least another of said abutting faces being positioned between said flanged edges and having edges engageable with said flanged edges providing overlapping joints whereby the roots of plants are confined to the cavities separated by said abutting partitions, said base member having corresponding base partitions extending towards and engageable with said base ends of said abutting partitions on said side members, abutting faces at base joints between said base partitions and said base ends of said abutting partitions, said abutting faces of said base partitions at said base joints having flanged edges extending throughout the length of said base partitions in other planes from said abutting faces of said base partitions, said abutting faces at said ends of said side partitions being positioned between said flanged edges and having edges engageable with said flanged edges of said abutting faces of said base partitions, said side members being hingedly connected to said base member, at least one of said abutting faces of said partitions at each of said joints having means releasable connection with another of said abutting faces to hold said abutting faces between said flanged edges, said side members having parallel walls forming opposite sides of each of said cavities, each of said walls having a panel in each of said cavities and said panel being sloped inwardly towards the top of the cavity, said base member having a base wall forming the bottom of each of said cavities and said base wall having a recess in the bottom of each of said cavities.

2. A multicavity planter comprising a base member and two opposing side members, abutting partitions on said side members disposed at spaced-apart positions along said side members providing cavities therebetween, said abutting partitions having base ends and abutting faces at joints between said partitions, at least one of said abutting faces at each of said joints having flanged edges extending throughout the length of said partitions in another plane from said one of said abutting faces, at least another of said abutting faces being positioned between said flanged edges and having edges engageable with said flanged edges providing overlapping joints whereby the roots of plants are confined to the cavities separated by said abutting partitions, said base member having corresponding base partitions extending towards and engageable with said base ends of said abutting partitions on said side members, abutting faces at base joints between said base partitions and said base ends of said abutting partitions, said abutting faces of said base partitions at said base joints having flanged edges extending throughout the length of said base partitions in other planes from said abutting faces of said base partitions, said abutting faces at said ends of said side partitions being positioned between said flanged edges and having edges engageable with said flanged edges of said abutting faces of said base partitions, said side members being hingedly connected to said base member, at least one of said abutting faces of said partitions at each of said joints having a pin projecting outwardly and at least another of said abutting faces having a socket for releasable engagement with said pin, said side members having parallel walls forming opposite sides of each of said cavities, each of said walls having a panel in each of said cavities and said panel being sloped inwardly towards the top of the cavity, said base member having a base wall forming the bottom of each of said cavities and said base wall having a recess in the bottom of each of said cavities.

* * * * *

UNITED STATES PATENT OFFICE
CERTIFICATE OF CORRECTION

Patent No. 3,986,299     Dated October 19, 1976

Inventor(s) Leo A. Merzweiler

It is certified that error appears in the above-identified patent and that said Letters Patent are hereby corrected as shown below:

Column 4, line 6, reading "joints having means releasable connection with another"

Should read --joints having releasable connection means with another--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*